March 13, 1962  H. L. HAMANN  3,024,509
FASTENING MEANS AND METHOD OF APPLYING THE SAME
Filed July 11, 1958  2 Sheets-Sheet 1
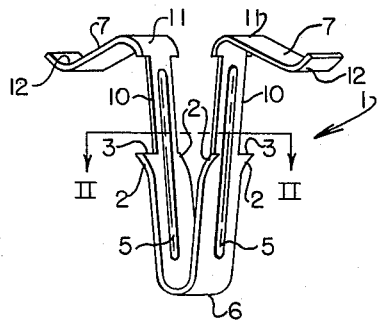
Fig. I
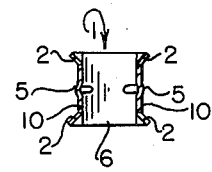
Fig. II
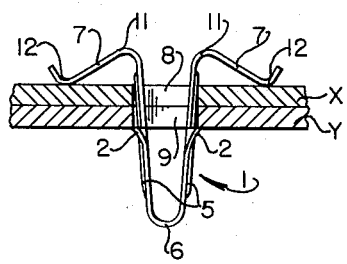
Fig. III
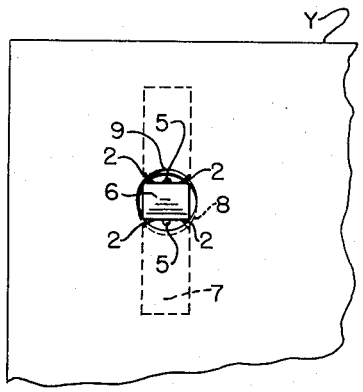
Fig. IV
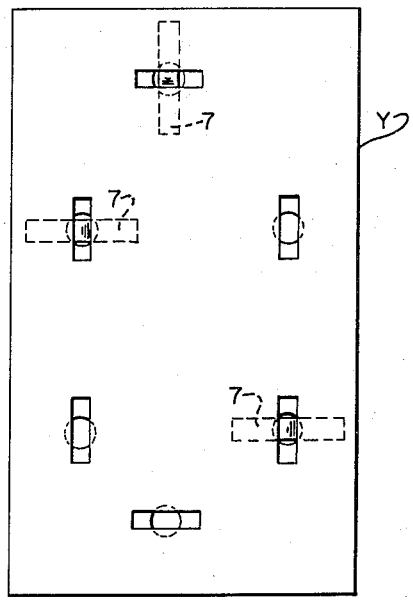
Fig. V
INVENTOR.
HARRY L. HAMANN
BY
Marshall, Marshall & Yeasting
ATTORNEYS March 13, 1962 H. L. HAMANN 3,024,509
FASTENING MEANS AND METHOD OF APPLYING THE SAME
Filed July 11, 1958 2 Sheets-Sheet 2
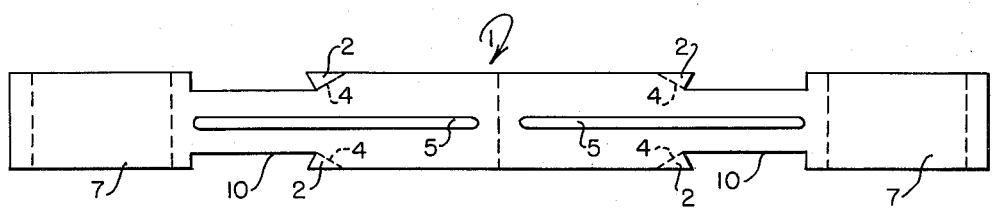
Fig. VI
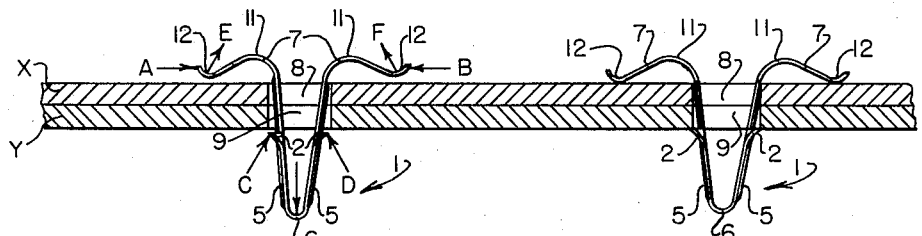
Fig. VII
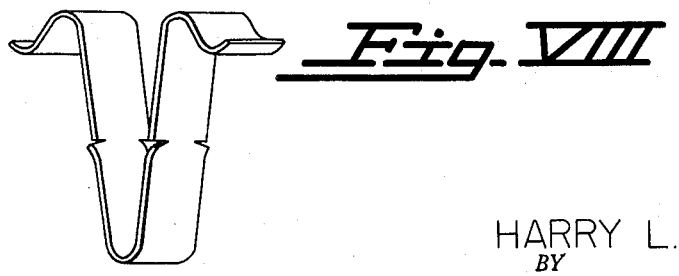
Fig. VIII
INVENTOR.
HARRY L. HAMANN
BY
Marshall, Marshall & Yeasting
ATTORNEYS

United States Patent Office 3,024,509
Patented Mar. 13, 1962

3,024,509
FASTENING MEANS AND METHOD OF
APPLYING THE SAME
Harry L. Hamann, Toledo, Ohio, assignor to Production
Metal Stamping Company, Toledo, Ohio, a corporation of Ohio
Filed July 11, 1958, Ser. No. 747,869
11 Claims. (Cl. 24—73)

This invention relates to devices for fastening sheets of metal, fiber board and the like to other sheets or to frames. The interiors of refrigerators, for example, often are lined with sheet metal and the interiors of automobile trunks and bodies often are lined with fiber board. In such structures, the sheet metal or fiber board usually is held in place by bolts or screws which are turned by automatic screw drivers into holes punched through the sheet metal or fiber board and registering with holes punched or drilled in the metal frame to which the lining is to be fastened. If the holes do not register with close accuracy the screws are liable to go askew and to fail to hold.

The screws usually are of the "self tapping" type which cut threads in the metal framework as the screws are turned into the holes. If one of these screws is turned in too tightly it may strip the threads that it has cut. Then fresh holes must be drilled. If the lining ever has to be taken off the screws can be backed out but they are liable to become loose after they have been again screwed into the old holes. Even screws that never have been removed are liable to become loose from vibration and from shock strains such as occur when doors are slammed.

The weaknesses and disadvantages of self tapping screws have motivated the invention and variance of resilient fasteners which are equipped with barbs that, when the resilient fasteners are positioned into registering holes, spring outwardly to prevent the fasteners from working loose or the sheets from accidentally coming apart.

It is an object of this invention to provide a fastener which can be sprung into condition to be inserted easily into registering holes in thin members that are to be fastened together, the fastener having teeth which spring outwardly under the edges of the holes in one of the members and having resilient wings which, after the fastener is in place, press upon the other of the members to reliably tighten, by resiliently clamping the members together.

It is another object of this invention to provide a fastener which can be utilized with facility in either round holes or rectangular holes.

It is an important object of this invention to provide a fastener having the characteristics mentioned in the preceding paragraph which fastener can be inserted into holes that are somewhat out of accurate registration, and will hold securely therein.

It is another object of the invention to provide a fastener which when in use is not susceptible of being loosened by jarring or vibration.

Another object is to provide a fastener which is flexible against shocks but is not liable to accidental failure.

It is a further object to provide a fastener which is not liable to damage by the employment of excessive force in applying the fastener to attach members tightly to each other.

A further object is to provide a fastener which is easy to remove and which can be repeatedly reused.

And still a further object is to provide a fastener which is less expensive than screws or bolts.

Other objects and numerous advantages of the invention will be apparent upon perusal of the following description as illustrated by the accompanying drawings, in which:

FIG. I is a view in perspective on an enlarged scale of a fastener embodying the invention;

FIG. II is a cross sectional view taken as indicated by the line II—II of FIG. I;

FIG. III is a view on a smaller scale showing a fastener embodying the invention in use for fastening together two members of sheet material pierced by round holes, which members are shown in section;

FIG. IV is a fragmentary plan view showing the fastener used in holes of the same size which are slightly out of registration;

FIG. V is a plan view on a still smaller scale showing two members of sheet material, one of the members having round holes and the other member having long rectangular holes, fasteners embodying the invention being inserted in some of the holes;

FIG. VI is a view on an enlarged scale of a piece of strip metal having portions of its margins cut away and beads being formed in said piece preparatory to bending into the shape illustrated in FIG. I;

FIG. VII is a sectional view of two flat members having registering holes, a fastener of this invention being shown in process of being applied to said members and another fastener of this invention being shown in place and functioning to hold said members together; and FIG. VIII is a view in perspective showing a modified form of fastener.

The drawings illustrate preferred forms of the invention but are not intended to circumscribe its scope.

In the form as illustrated, the fastener 1 consists of an integral piece cut from a narrow strip of spring steel. Teeth 2 are punched to project outwardly from one face of the piece at its margin with the lands 3 of the teeth substantially perpendicular to the principal axis of the fastener, as shown in the drawings particularly in FIG. I. The notches above the teeth may be sufficiently acute to make the lands 3 of the teeth 2 perpendicular to the outer sides of the fastener when the teeth 2 are bent outwardly along the lines 4 (FIG. VI). Beads 5 are pressed into the piece between the teeth 2.

The piece is bent at its center into a V-shaped portion with a rounded apex 6 so that the teeth 2 project outwardly from the strip in a set of four teeth at points which are equally distant from the rounded apex. Portions of the strip that are beyond the set of teeth 2 are bent outwardly into recumbent S-shaped wings 7 with upturned tips. The piece is narrowed from the teeth 2 upwardly toward the S-shaped wings 7 by cutting away the margins of the strip. The beads 5 extend along the entire narrowed portion. The fasteners may be heat treated en masse after punching and bending to impart optimum hardness and resiliency.

In using the fastener illustrated in FIG. I to fasten together a top sheet X and a bottom sheet Y which are pierced with round holes 8 and 9 as shown in FIG. III, the sides of the V-shaped portion of the fastener 1 are moved toward each other to decrease the distance between the pair of teeth 2 on one side of the V-shape and the pair of teeth 2 on the other side of the V-shape until all four of the teeth as a group will pass through the holes 8 and 9.

Moving the sides of the V-shaped portion of the fastener toward each other also swings the wings 7 away from the plane through the lands 3 of the teeth 2 so that when the fastener as a whole is thrust through the holes 8 and 9 until the teeth are beyond the bottom surface of the sheet Y and the pinching pressure is relieved the teeth 2 move outwardly under the bottom of the sheet Y and the wings 7 engage and are pressed upon the top of the sheet X as the sides of the V-shaped portion spring apart.

As illustrated in FIG. VII, when force is applied in the directions indicated by the arrows A and B the teeth 2 swing in the directions indicated by the arrows C and D until the teeth 2 can pass through the holes 8 and 9 in the sheets X and Y. At the same time the wings 7 swing upwardly in the direction indicated by the arrows E and F so that the fastener can be thrust into the holes 8 and 9 until the teeth 2 get beyond the bottom surface of the sheet Y before the wings 7 come into tight engagement with the top surface of the sheet X. When the pinching pressure in the directions A and B is relieved the sides of the V-shaped portion swing further apart moving the teeth 2 into engagement with the bottom surface of the sheet Y and causing the wings 7 to press forcibly against the top surface of the sheet X (see FIG. VII).

It is possible to apply the fastener by forcibly pushing the V-shaped portion through the holes 8 and 9 with the teeth 2 scraping against the interior surfaces of the holes and the wings 7 after they engage the top surface of the sheet X being forcibly deformed until the teeth 2 get through the holes and can spring out beneath the bottom surface of the sheet Y. This is a rougher procedure than that illustrated by FIG. VII and hereinbefore described. To drive the fasteners far enough through the holes an impatient mechanic may strike the wings 7 hard enough to permanently distort the fasteners.

Various sorts of tools may be used for applying the fasteners of this invention according to the non-abusive method of application illustrated in FIG. VII. It is believed that tools and machines for carrying out such a nonabusive method are proper subject matter for separate patents.

The narrowed portions 10 of the fastener 1 which extend upwardly from the teeth 2 permit the teeth to engage more securely under the edge of the hole 9 in the bottom sheet Y, even though the holes 8 and 9 be somewhat out of accurate registration and even though the hole 8 in the top sheet X be somewhat larger than the hole 9 in the bottom sheet Y. Generally it is less expensive to make all holes in a structure the same size, particularly if holes intended to receive a fastener are drilled in top and bottom sheets, or in sheets and frame members, in one operation. The bottom hole must be small enough so that, when the sides of the V-shaped portion of the fastener 1 are apart as far as they can diverge when fully inserted in holes such as 8 and 9, the teeth will extend well beyond the edge of the bottom hole. The narrowed portions or shanks 10 facilitate assembly and give the same secure effect that could be obtained more expensively by making the top hole 8 larger than the bottom hole 9. It should be noted that the teeth as they are cut and formed project from the widest part of the piece, and that the effective lands of the teeth that engage the underside of the bottom sheet are increased by the narrowing of the piece above the teeth.

The lands 3 of the teeth 2 lie approximately in a plane which is perpendicular to a line bisecting the V of the V-shaped portion of the piece. This plane may be denominated a "teeth plane." The wings 7 include humps 11 and arcuate portions 12, the orcuate portions 12 being adapted to engage a flat surface of a sheet or other part to which the fastener is applied. The arcuate portions 12 lie approximately in a plane which is about parallel to the teeth plane and which may be denominated a "wings plane."

The wings 7, which were flexed as the divergent sides of the V-shaped portion were spread apart or as the V-shaped portion was forced deeper through the holes 8 and 9, react resiliently to pull the teeth 2 tightly against the lower side of the bottom sheet Y and to press the arcuate porions 12 upon the upper sheet X and thus clamp the upper sheet tightly against the upper side of the bottom sheet Y. Nevertheless, the S-shaped wings 7 are sufficiently yieldable to withstand shocks and vibration and minimize wear between the fastener and the sheets that it holds together.

The purpose of the beads 5 is to stiffen the sides of the V-shaped portion of the fastener where they are notched and narrowed. The beads 5 counteract such weakening effect as results from punching the teeth outwardly. The sides of the V-shaped portion are stiffened by the beads 5 without reducing the flexibility of the rounded apex 6 or the flexibility of the S-shaped wings 7 which yield as they are pushed against the surface of the member X to sink the V-shaped portion more deeply into the holes 8 and 9. The fastener thus is made stiff where it should be stiff and flexible where it should be flexible.

The beads can be pressed into the sides in the same operation as that in which the teeth are punched and the shanks 10 are narrowed or by a separate operation. Flexing of the wings 7 enables the fastener to accommodate itself to variations in thickness of the elements that it fastens together.

Where a stack of three or more sheets is to be held together, the fastener may be first inserted through holes in the top sheet and an intermediate sheet, and one or more other sheets may be added before the fastener is pushed home with the teeth springing outwardly beneath the bottom sheet.

Holes in which the fastener of this invention is inserted may be rectangular as well as round. Where the holes are rectangular their dimensions in one direction should be very little greater than the width of the strip stock from which the fastener is made. Their dimensions in the other direction may vary from somewhat less to much greater than the width of the strip stock from which the fastener is made. As shown in FIG. V, the rectangular holes in one of the sheets may be elongated to provide for some mispositioning of the holes in the other sheet. As shown in FIG. V, the holes in one sheet may be round while the holes in the other sheet are elongated.

For some purposes the beads 5 can be omitted and in some cases the fastener 1 may not be narrowed as indicated at 10. FIG. VIII shows a modification in which the piece is not beaded longitudinally and the fastener is made of relatively stout stock while remaining sufficiently flexible for application to sheets of tough material. In such applications the stout stock is sufficiently flexible for handling and is adequately cushioned against jarring and vibration.

Because the teeth in all forms of the device project outwardly (not edgewise) from the margins of the flat strip they catch beneath the bottom sheet whether the holes be round or rectangular.

To remove the fastener from round or rectangular holes the sides of the V-shaped portion are pressed toward each other thus withdrawing the teeth 2 from beneath the edge of the hole 9 and relieving the pressure of the wings 7 against the top of the sheet X. With the sides of the V-shaped portion still pressed toward each other the fastener can be lifted freely out of the holes 8 and 9.

In addition to the advantages of being easy to insert, not easily jarred loose, flexible against shocks, not liable to strip threads, easy to remove, and capable of repeated use, the applicant's fastener is very inexpensive to produce.

It is to be understood that the forms of fastener described in the foregoing specification and illustrated in the accompanying drawings are exemplary only and that various other modifications are within the scope of the invention as defined in the subjoined claims.

This is a continuation-in-part of my application Serial No. 709,347 filed January 16, 1958, now abandoned.

I claim:

1. A fastener formed of a flat piece of spring metal, comprising, in combination, a substantially V-shaped portion with divergent sides having opposed longitudinal edges along a substantial portion of their lengths defining a pair of bounding parallel planes, the major faces of said sides being perpendicular to the bounding planes, teeth on said edges of said sides and projecting outwardly from the major surfaces of the divergent sides of said V-shaped portion and within said bounding planes, said teeth having lands at their limits most remote from the apex of said V-shaped portion lying approximately in a teeth plane which is substantially perpendicular to a line which bisects the V of said V-shaped portion, and wings extending laterally from the divergent sides of said V-shaped portion and formed with arcuate portions adapted to engage a flat surface, said arcuate portions lying approximately in a wings plane which is about parallel to said teeth plane, said wings having opposed longitudinal edges along a substantial portion of their lengths lying in said bounding planes and major faces which are perpendicular thereto, the entire fastener structure lying between said bounding planes, the geometry and resiliency of said piece of spring metal being such that when the divergent sides of said V-shaped portion are moved toward each other the teeth plane and the wings plane move away from each other and when said divergent sides spring away from each other the teeth plane and the wings plane approach each other, whereby articles located between said teeth plane and said wings plane and penetrated by said V-shaped portion can be held together by said fastener.

2. A fastener formed of a flat piece of spring metal, comprising, in combination, a substantially V-shaped portion with divergent sides having opposed longitudinal edges along a substantial portion of their lengths defining a pair of bounding parallel planes, the major faces of said sides being perpendicular to the bounding planes, teeth on said edges of said sides and projecting outwardly from the major surfaces of the divergent sides of said V-shaped portion and within said bounding planes, said teeth having lands at their limits most remote from the apex of said V-shaped portion lying approximately in a teeth plane which is substantially perpendicular to a line which bisects the V of said V-shaped portion, and wings extending laterally from the divergent sides of said V-shaped portion and adapted to engage a flat surface at points lying approximately in a wings plane which is about parallel to said teeth plane, said wings having opposed longitudinal edges along a substantial portion of their lengths lying in said bounding planes and major faces which are perpendicular thereto, the entire fastener structure lying between said bounding planes, the geometry and resiliency of said piece of spring metal being such that when the divergent sides of said V-shaped portion are moved toward each other the teeth plane and the wings plane move away from each other and when said divergent sides spring away from each other the teeth plane and the wings plane approach each other, whereby articles located between said teeth plane and said wings plane and penetrated by said V-shaped portion can be held together by said fastener.

3. A fastener formed of a flat piece of spring metal, comprising, in combination, a substantially V-shaped portion with divergent sides having opposed longitudinal edges along a substantial portion of their lengths defining a pair of bounding parallel planes, the major faces of said sides being perpendicular to the bounding planes, teeth projecting outwardly from the divergent sides of said V-shaped portion and within said bounding planes, said teeth having lands at their limits most remote from the apex of said V-shaped portion lying approximately in a teeth plane which is substantially perpendicular to a line which bisects the V of said V-shaped portion, and wings extending laterally from the divergent sides of said V-shaped portion and adapted to engage a flat surface at points lying approximately in a wings plane which is about parallel to said teeth plane, said wings having opposed longitudinal edges along a substantial portion of their lengths lying in said bounding planes and major faces which are perpendicular thereto, the entire fastener structure lying between said bounding planes, the geometry and resiliency of said piece of spring metal being such that when the divergent sides of said V-shaped portion are moved toward each other the teeth plane and the wings plane move away from each other and when said divergent sides spring away from each other the teeth plane and the wings plane approach each other, whereby articles located between said teeth plane and said wings plane and penetrated by said V-shaped portion can be held together by said fastener, said piece having narrowed portions extending for a substantial distance from said teeth away from the apex of such V, said piece having stiffening beads extending between said teeth and along said narrowed portions.

4. A fastener formed of a flat piece of spring metal a portion of said piece being substantially in the form of a V, said piece having margins along substantial lengths of opposed portions of each arm of the V defining a pair of bounding planes which are parallel, teeth on said margins having lands at their limits most remote from the apex of said V substantially lying in a plane perpendicular to the bisector of said V, said teeth projecting outwardly from the plane of said piece and being confined between said bounding planes, said piece having narrowed portions extending for a substantial distance from said teeth away from the apex of such V, said piece having stiffening beads extending between said teeth and along said narrowed portions, and the major surfaces of said piece being perpendicular to said bounding planes.

5. A fastener formed of a flat piece of spring metal a portion of said piece being substantially in the form of a V, said piece having margins along substantial lengths of opposed portions of each arm of the V defining a pair of bounding planes which are parallel, a set of four teeth on said margins each having lands at their limits most remote from the apex of said V substantially lying in a plane perpendicular to the bisector of said V, said teeth projecting outwardly therefrom, said teeth being equally spaced from the apex of said V and being confined between said bounding planes said piece having narrowed portions extending from said teeth in directions away from the apex of such V, said piece having stiffening beads extending between said teeth and along said narrowed portions, and the major surfaces of said piece being perpendicular to said bounding planes.

6. A fastener comprising a resilient metallic ribbon all portions of which fall between a pair of spaced parallel limit planes perpendicular to the major ribbon surfaces, a pair of arms of equal length formed of a central portion of said ribbon and diverging from an apex at their junction, a tooth on each longitudinal edge of each arm upset out of the surface of said arm and diverging from the plane bisecting the angle of divergence of said arms and perpendicular to said parallel planes, all teeth being spaced an equal distance from said apex to define at their tips a tooth plane perpendicular to said bisecting plane and said parallel planes, each tooth having a land defining its limit most remote from said apex and generally lying in said tooth plane, a wing integral with each arm at its divergent end having a recumbent S form with the concave arcuate portion of each wing which is directed from the apex being tangent to a wing plane parallel to and critically spaced from said tooth plane, opposed longitudinal edges of each arm over a substantial portion of its length lying in the spaced limit planes, and opposed longitudinal edges of each wing over a substantial portion of its length lying in the spaced limit planes.

7. A fastener according to claim 6 in combination with a plurality of superposed elements having registering apertures and a spacing between the two outermost surfaces of the superposed elements greater than said critically spaced tooth and wing planes whereby the insertion of said arms through said apertures to a point carrying said wings into contact with the first outermost surface and said tooth plane beyond said second outermost surface causes said wings to resiliently draw said teeth into engagement with said second outermost surface.

8. A fastener according to claim 6 wherein said arms have a narrowed portion extending from each tooth to beyond the wing plane.

9. A fastener according to claim 6 wherein said arms have a narrowed portion extending from each tooth toward the wing plane.

10. A fastener according to claim 9 wherein said arms have a longitudinal bead extending over substantially their entire length.

11. A fastener comprising a resilient metallic ribbon all portions of which fall between a pair of spaced parallel limit planes perpendicular to the major surfaces of the ribbon, a pair of arms diverging from an apex at their junction and formed of a length of said ribbon intermediate its ends, a tooth on each longitudinal edge of each arm upset out of the surface of said arm and diverging from the plane bisecting the angle of divergence of said arms and perpendicular to said parallel limit planes, all of said teeth being equidistant from said apex and defining at their tips a tooth plane perpendicular to said bisecting plane and said parallel planes, each tooth having a land defining its limit most remote from said apex and generally lying in said tooth plane, and a wing integral with each arm at its divergent end, each wing having a first portion remote from said arm and tangent to a wing plane parallel to and critically spaced from said tooth plane, each wing having a second portion more proximate to said arm than said first portion and spaced farther from said apex than said wing plane, the opposed longitudinal edges of a substantial portion of the length of each arm and each wing lying in the spaced limit planes.

References Cited in the file of this patent

UNITED STATES PATENTS

| | | |
|---|---|---|
| 1,694,291 | Sywert | Dec. 4, 1928 |
| 2,100,551 | Reiter | Nov. 30, 1937 |
| 2,198,186 | Tinnerman | Apr. 23, 1940 |
| 2,627,099 | Becker | Feb. 3, 1953 |
| 2,658,248 | Kost | Nov. 19, 1953 |
| 2,692,414 | Poupitch | Oct. 26, 1954 |
| 2,720,289 | Henrickson | Oct. 11, 1955 |

FOREIGN PATENTS

| | | |
|---|---|---|
| 563,799 | Great Britain | Aug. 30, 1944 |
| 701,049 | Great Britain | Dec. 16, 1953 |
| 751,819 | Great Britain | July 4, 1956 |
| 1,028,266 | France | Feb. 25, 1953 |